United States Patent [19]

Billeter, deceased

[11] Patent Number: 4,570,763

[45] Date of Patent: Feb. 18, 1986

[54] TRUCK MOUNTED AIR CYLINDER AND SLACK ADJUSTER

[75] Inventor: Henry R. Billeter, deceased, late of Marco Island, Fla., by Lucille Billeter, administratrix

[73] Assignee: Sloan Valve Company, Franklin Park, Ill.

[21] Appl. No.: 524,743

[22] Filed: Aug. 19, 1983

[51] Int. Cl.[4] .............................................. F16D 65/74
[52] U.S. Cl. .................................. 188/196 D; 188/203
[58] Field of Search ................... 188/196 D, 203, 202, 188/196 BA, 71.9; 92/13

[56] References Cited

U.S. PATENT DOCUMENTS

| | | | |
|---|---|---|---|
| 2,684,132 | 7/1954 | Snyder | 188/203 |
| 3,401,775 | 9/1968 | Sobol et al. | 188/196 D |
| 3,744,596 | 7/1973 | Sander | 188/196 D X |
| 3,891,067 | 6/1975 | Axelsson | 188/196 D |
| 4,005,767 | 2/1977 | Farello | 188/203 |
| 4,064,973 | 12/1977 | Deem et al. | 188/71.9 X |
| 4,385,548 | 5/1983 | Persson et al. | 188/196 D X |
| 4,431,089 | 2/1984 | Nados et al. | 188/202 X |

Primary Examiner—Duane A. Reger
Assistant Examiner—Michael P. Gilday
Attorney, Agent, or Firm—Kinzer, Plyer, Dorn & McEachran

[57] ABSTRACT

A truck mounted air cylinder and slack adjuster incorporates an elongated brake operating member adapted to apply a brake applying thrust to the brake beams. An air cylinder is mounted to the truck and a threaded rod is attached to the brake operating member and extends into the air cylinder. A drive member is positioned within the air cylinder and is in sealing relationship with the cylinder walls. The drive member is movable within the cylinder in response to a brake application air pressure applied thereto. A clutch connecting the threaded rod to the drive member for concurrent axial movement with the clutch provides for rotation of the rod relative to the drive member. A slack adjuster is associated with the cylinder and the rod. The slack adjuster cooperates with the clutch to extend the rod relative to the elongated brake operating member in response to a slack condition sensed by the slack adjuster during a brake application.

6 Claims, 3 Drawing Figures

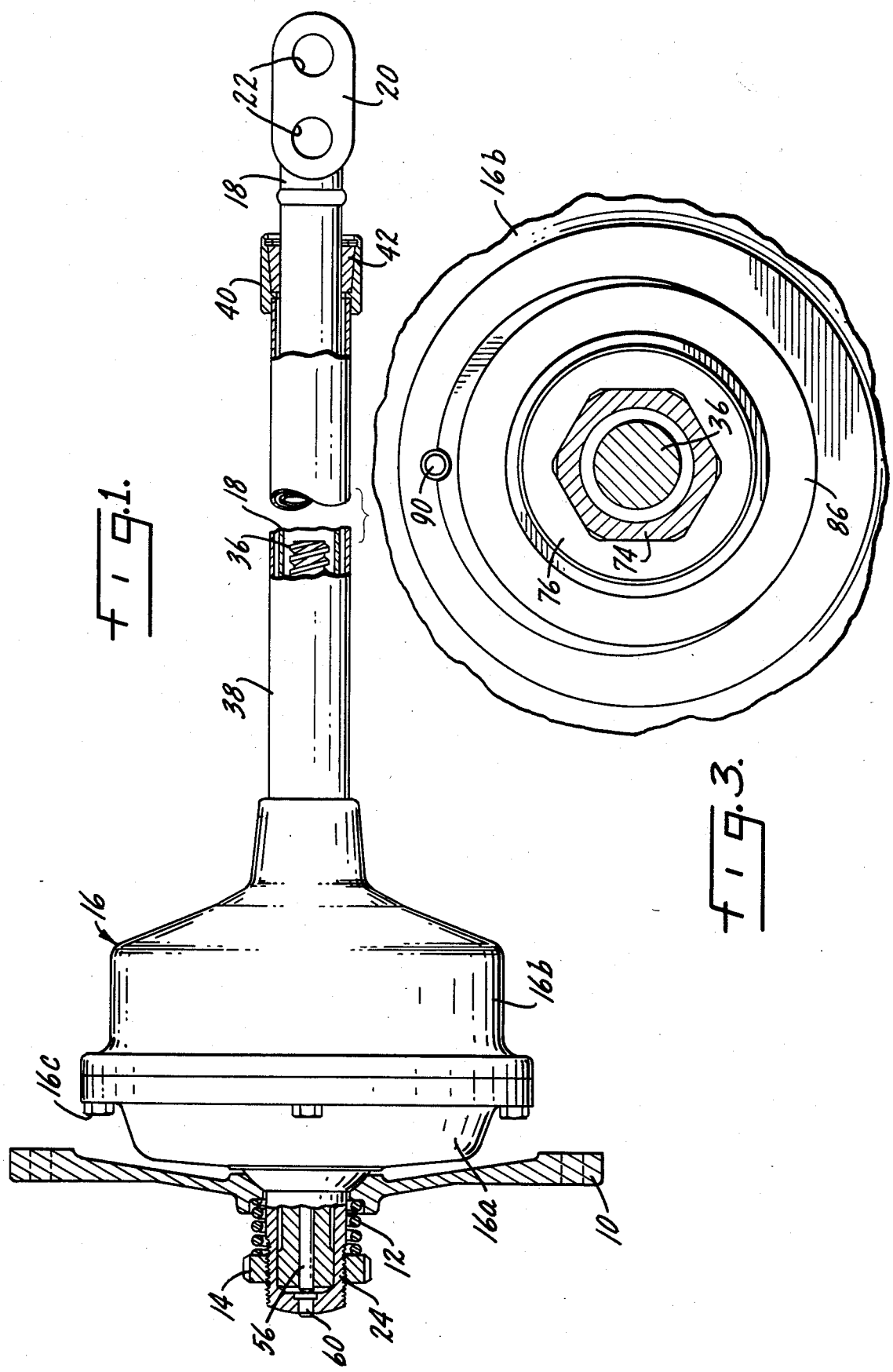

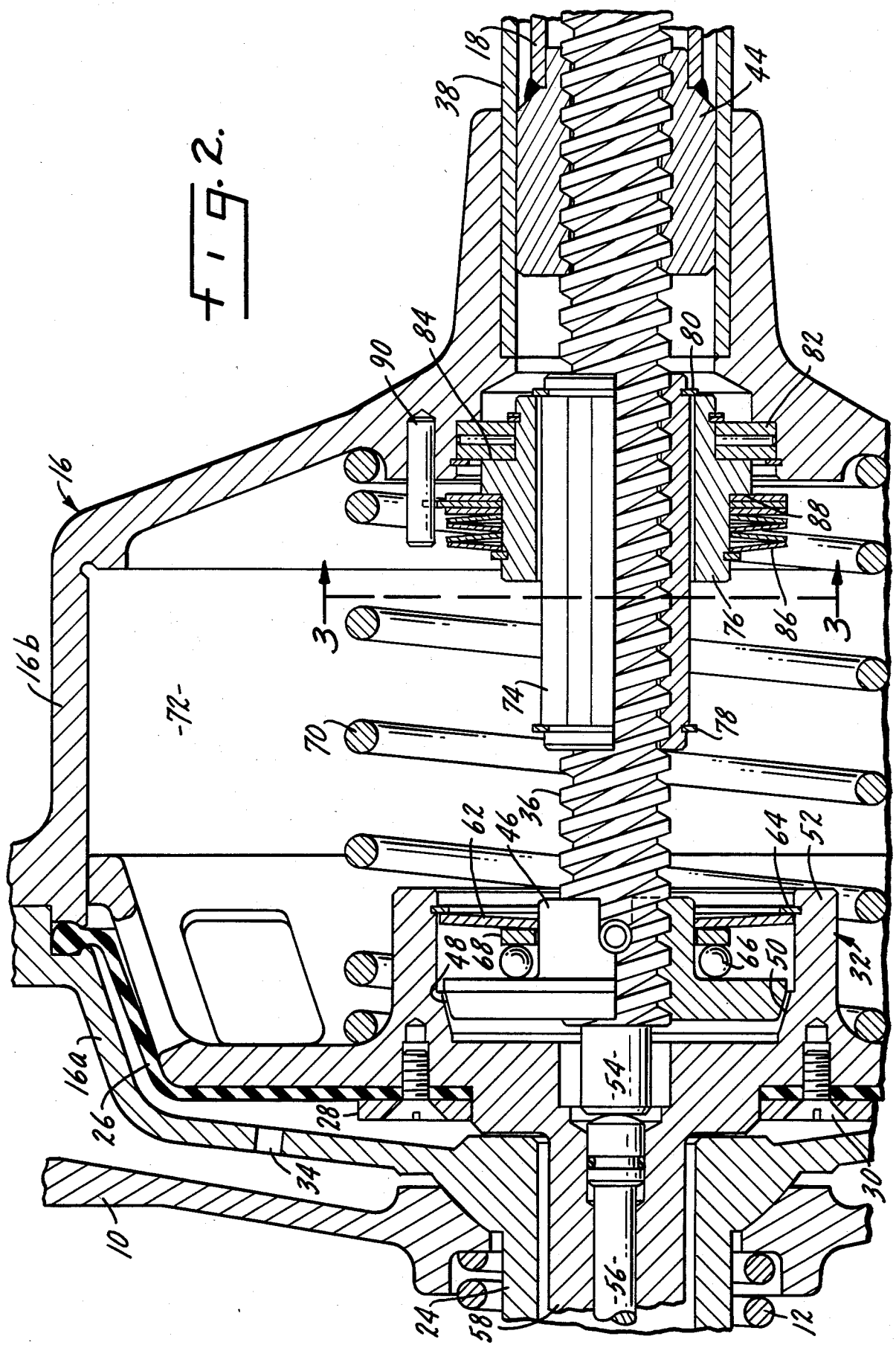

TRUCK MOUNTED AIR CYLINDER AND SLACK ADJUSTER

SUMMARY OF THE INVENTION

The present invention relates to railroad truck mounted air cylinders and slack adjusters and particularly to a combination thereof.

A primary purpose is a simply constructed reliably operable combination truck mounted air cylinder and brake slack adjuster.

Another purpose is a combination air cylinder and brake slack adjuster of the type described which automatically adjusts the length of piston travel in response to a sensed slack condition.

Another purpose is a combination air cylinder and slack adjuster of the type described which provides for manual slack let-out to facilitate the installation of new brake shoes.

Other purposes will appear in the ensuing specification, drawings and claims.

BRIEF DESCRIPTION OF THE DRAWINGS

The invention is illustrated diagrammatically in the following drawings wherein:

FIG. 1 is a side view of one embodiment of combination air cylinder and slack adjuster, FIG. 2 is a partial enlarged section of the slack adjuster of FIG. 1, and FIG. 3 is a section along plane 3—3 of FIG. 2.

DESCRIPTION OF THE PREFERRED EMBODIMENT

The present invention relates to a combination air cylinder and slack adjuster for railroad freight cars and particularly to such a unit which is truck mounted. In the drawings, a mounting bracket 10 will be conveniently attached to a portion of the truck structure and, through a coiled spring 12 and an attachment nut 14, will mount air cylinder housing 16 to the truck. At the opposite end of the combination air cylinder and slack adjuster, an elongated brake application member 18 terminates in a yoke 20 which has mounting openings 22 for use in attaching brake application member 18 to the brake beams of the truck. Thus, the unit is mounted, by bracket 10, to the structure of the truck with the opposite end of the unit being attached to the brake beams of the truck.

Air cylinder housing 16 includes an axial extension 24 having a threaded area which mounts nut 14. Housing 16 may conveniently be formed in two sections, indicated at 16a and 16b, which two sections will be fastened together by a plurality of spaced peripherally disposed bolts or the like 16c. In the area of attachment of the two housing sections, a diaphragm 26 is peripherally mounted, with the central interior portion of the diaphragm being mounted by a small plate 28 and a plurality of screws or the like 30 to a centrally disposed drive member or piston 32. Housing section 16a will have an air port 34 which will be in communication with the left-hand side of diaphragm 26 so as to apply a brake application force to the diaphragm and thus to the air cylinder and slack adjuster structure as described hereinafter.

Positioned within housing 16 and on the right-hand side of drive member 32 is a threaded rod 36 which extends outwardly from the housing and into a tube 38 coaxial with the housing and extending coextensive with the brake application member 18. The far right end of tube 38 may support a small collar 40 and a mounting member 42 which supports the far outboard end of brake application member 18. Brake application member 18, at its interior end within tube 38, has a nut 44 thereon which is in threaded engagement with threaded rod 36. Thus, threaded rod 36 and brake application member 18 may be concurrently axially moved to apply and release the brakes and may be relatively rotationally moved, one to the other, to adjust slack.

The interior or left-hand end of threaded rod 36 mounts a clutch member 46, the exterior peripheral surface 48 of which is positioned for frictional engagement with an interior surface 50 of an axial projection 52 of drive member 32. Threaded rod 36 has an axially extending nose 54 which is in engagement with the end of a pin 56 extending through a coaxial projection 58 of the drive member and into portion 24 of housing 16. A small button 60 is mounted in the end of coaxial housing projection 24 and is positioned to apply a slack adjusting pressure to pin 56 and thus to threaded rod 36 and clutch member 46 to add slack to the system when new brake shoes are being applied.

Clutch member 46 is positioned within drive member projection 32 and yieldingly urged to the left therein by a thrust washer or Bellville spring 62 mounted upon a retaining ring 64. A bearing 66 mounted on a thrust ring 68 completes the assembly forming the clutch effective between the drive member and the threaded rod.

A large coil spring 70 is positioned within chamber 72 formed between housing section 16b and the right-hand side of diaphragm 26 and drive member 32. Spring 70 is seated at one side upon the housing and at the opposite side upon the drive member, thus normally urging the drive member and the threaded rod clutched thereto to a brake release position, as shown in the drawings.

An elongated drive nut 74 has an interior thread matching that of threaded rod 36 and is mounted upon the rod for concurrent axial movement and relative rotational movement. The exterior of drive nut 74 may have a hexagonal shape which is matched by the interior shape of a collar 76 slidingly mounted thereon. Drive nut 74 may have stop rings 78 and 80 at opposite ends thereof limiting the axial relative movement between the drive nut and its exteriorly mounted collar 76. A bearing 82 is mounted upon a shoulder 84 of collar 76 to provide relative rotational movement between the collar and housing 16. A friction clutch 86 is mounted upon a further shoulder 88 of collar 76 and, through a pin 90, limits rotational movement of collar 76, in only one direction, relative to housing 16 to provide slack adjustment, as hereinafter described.

In operation, and assuming that a brake application is to be made, air under pressure is supplied in the conventional manner through port 34 to the left side of diaphragm 26 and its associated drive member 32. The drive member will move to the right toward a brake applying position. Clutch member 46, under the influence of spring member 62, will have its clutch surface 48 fast against surface 50 of drive member projection 52. Thus, threaded rod 36 will axially move coextensively with the drive member.

As threaded rod 36 moves to the right, it will carry brake application member 18, and thus the brake beams, with it. As rod 36 moves to the right, drive nut 74 will move with it until such time as stop 78 is in contact with the left-hand side of collar 76. If the brakes are applied prior to the time that the stop contacts the collar, there is clearly no slack in the system and a full brake application can be made without any subsequent slack take-up. On the other hand, if the brakes are not fully applied at such time as stop 78 contacts the left-hand side of collar 76, continued movement toward the right of threaded rod 36 will cause drive nut 74 and collar 76 through their mating hexagonal surfaces to rotate. Friction clutch 86 will resist movement of collar 76, although rotation will be permitted in an amount sufficient to complete brake application movement. Thus, as threaded rod 36 continues its movement to the final position to apply the brakes, assuming there is a degree of slack in the system, there may be rotary movement of drive nut 74 and its associated collar 76, as permitted by the friction clutch.

When the brakes are released, drive member 32 under the influence of spring 70 will move back toward the brake release position illustrated in the drawings. Threaded rod 36, and hence elongated brake application member 18, will move with it. At such time as stop 80 contacts the right side of collar 76, clutch member 46 will be disengaged from drive member 32, permitting threaded rod 36 to rotate. Such rotation provides for relative axial movement between the threaded rod and collar 44, thus causing the threaded rod and brake application member 18 to separate, one moving to the left, whereas, the other is stationary. The separation of these two members, an elongation of the entire brake application apparatus, takes up any slack in the system. Threaded rod 36 will continue to rotate until it has moved back to the full brake release position and clutch member 46 again is in frictional engagement with projection 52 of drive member 32, thus restraining or preventing further rotational movement of threaded rod 36.

The application and release steps will take place whenever the brakes are applied. Normally, there is no necessity to introduce slack into the system unless new brake shoes are to be installed. For that reason slack take-up is automatic, as described, and takes place on every brake application if there is slack, which of necessity must be removed from the system. Pin 56 will automatically disengage the clutch 46 from its seat on release of the brakes. Accordingly, a movement to the left of brake application member 18, has the effect of adding slack into the system to permit the installation of new shoes. As member 18 is moved to the left and the clutch on threaded rod 36 is released, the threaded rod will rotate within collar 44 causing these two members to move together, thus shortening the total distance between clutch 46 and the brake beam end of member 18. The reverse takes place under slack conditions when the total length of these two members is elongated.

Of importance in the invention is the simplicity of construction and the manner in which with a minimum number of parts it is possible to have a combined brake cylinder and automatic slack adjuster. The automatic nature of the slack adjuster only applies to slack take-up, whereas, slack let-out is done manually, as described.

Whereas the preferred form of the invention has been shown and described herein, it should be realized that there may be many modifications, substitutions and alterations thereto.

The embodiments of the invention in which an exclusive property or privilege is claimed are defined as follows:

1. A truck mounted air cylinder and slack adjuster including an elongated brake operating member, an air cylinder, a threaded rod attached to said brake operating member and extending into said air cylinder, a drive member positioned within said air cylinder and in sealing relationship with the wall thereof, said drive member moving within said cylinder in response to air pressure applied thereto, clutch means connecting said threaded rod to said drive member for concurrent axial movement therewith, said clutch means providing for rotation of said rod relative to said drive member, and slack adjusting means associated with said cylinder and rod and including a friction clutch coaxially mounted about said threaded rod, a collar threadedly mounted upon said threaded rod and movable both concurrently with and relative to said threaded rod, and a second collar mounted upon said first collar and peripherally supporting said friction clutch, said first collar being axially movable relative to said second collar, but being attached for simultaneous rotary movement relative to said threaded rod, said slack adjusting means cooperating with said clutch means to extend said rod relative to said elongated brake operating member in response to a slack condition sensed by said slack adjusting means during a brake application.

2. The device of claim 1 further characterized in that said brake operating member, threaded rod and drive member are coaxially arranged.

3. The device of claim 1 further characterized in that said clutch means includes a disc mounted adjacent one end of said threaded rod and biased toward said drive member.

4. The device of claim 1 further characterized in that said drive member is in the form of a piston and a peripheral seal formed about said piston and in sealing relationship with said air cylinder wall.

5. The device of claim 1 further characterized in that said drive member includes a diaphragm peripherally attached to said cylinder wall and centrally attached to a coaxially disposed drive element.

6. The device of claim 1 further characterized by and including stop means controlling the permitted axial movement of said collar relative to said peripherally positioned friction clutch.

* * * * *